United States Patent
Sun

(10) Patent No.: US 11,075,523 B2
(45) Date of Patent: Jul. 27, 2021

(54) METHOD AND DEVICE FOR CONTROLLING POWER STRIP

(71) Applicant: Beijing Xiaomi Mobile Software Co., Ltd., Beijing (CN)

(72) Inventor: Yongli Sun, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 18 days.

(21) Appl. No.: 16/586,199

(22) Filed: Sep. 27, 2019

(65) Prior Publication Data

US 2020/0136396 A1   Apr. 30, 2020

(30) Foreign Application Priority Data

Oct. 30, 2018   (CN) .......................... 201811280592.1

(51) Int. Cl.
*H02J 4/00* (2006.01)
*G05B 15/02* (2006.01)

(52) U.S. Cl.
CPC ................ *H02J 4/00* (2013.01); *G05B 15/02* (2013.01)

(58) Field of Classification Search
None
See application file for complete search history.

(56) References Cited

U.S. PATENT DOCUMENTS

| | | |
|---|---|---|
| 5,650,771 A | 7/1997 | Lee |
| 2005/0036258 A1 | 2/2005 | Ma et al. |
| 2007/0284431 A1 | 12/2007 | Pan |
| 2008/0265677 A1 | 10/2008 | Chiang |
| 2011/0266869 A1* | 11/2011 | Katru ................ H02J 13/00017 307/39 |
| 2013/0222959 A1* | 8/2013 | Sawyers .................. H02H 7/20 361/93.8 |

(Continued)

FOREIGN PATENT DOCUMENTS

| | | |
|---|---|---|
| CN | 102379075 A | 3/2012 |
| CN | 103513668 A | 1/2014 |

(Continued)

OTHER PUBLICATIONS

Supplementary European Search Report in the European application No. 19199961.4, dated Dec. 12, 2019.

(Continued)

*Primary Examiner* — Charles E Anya
(74) *Attorney, Agent, or Firm* — Finnegan, Henderson, Farabow, Garrett & Dunner, L.L.P.

(57) ABSTRACT

A method for controlling a power strip includes: acquiring a present temperature parameter of an ambient environment; determining a presently-allowed maximum power of the power strip based on the present temperature parameter; acquiring a total power of electronic devices presently powered by the power strip; and controlling the power strip to cut off power supply to at least one of the electronic devices when the total power is greater than the presently-allowed maximum power. In the technical solution, the presently-allowed maximum power of the power strip can be adjusted automatically based on the present temperature parameter of the ambient environment of the power strip, which improves flexibility of adjusting the maximum power.

15 Claims, 10 Drawing Sheets

(56) References Cited

U.S. PATENT DOCUMENTS

| | | | | |
|---|---|---|---|---|
| 2016/0190748 | A1* | 6/2016 | Emby | .................. H01R 25/003 340/654 |
| 2018/0115131 | A1 | 4/2018 | Kohen | |
| 2018/0188800 | A1 | 7/2018 | Alon | |
| 2018/0366885 | A1* | 12/2018 | Hewitt | ................... G05B 15/02 |

FOREIGN PATENT DOCUMENTS

| | | |
|---|---|---|
| CN | 206349593 U | 7/2017 |
| CN | 107390534 A | 11/2017 |
| CN | 207098186 U | 3/2018 |
| CN | 108092099 A | 5/2018 |
| CN | 108335176 A | 7/2018 |
| CN | 108475939 A | 8/2018 |
| CN | 207925833 U | 9/2018 |
| CN | 109450005 A | 3/2019 |
| EP | 1868278 A2 | 12/2007 |
| JP | H10-234133 A | 9/1998 |
| JP | 2014-36466 A | 2/2014 |
| JP | 2017-212845 A | 11/2017 |
| JP | 2018-139099 A | 9/2018 |
| KR | 10-0939234 B1 | 1/2010 |
| KR | 10-2018-0003964 A | 1/2018 |
| RU | 2506680 C2 | 2/2014 |
| TW | 200745833 A | 12/2007 |
| WO | WO 2013/022035 A1 | 2/2013 |
| WO | WO 2013/161342 A1 | 10/2013 |

OTHER PUBLICATIONS

First Office Action of Russian Application No. 2019129481/07(058045), dated Apr. 15, 2020.
Decision on Granting of Russian Application No. 2019129481/07(058045), dated Jun. 4, 2020.
International Search Report in the International Application No. PCT/CN2019/080236, dated Aug. 2, 2019.
Notification of Reason for Refusal dated Feb. 5, 2021, from Intellectual Property Office of Korea in counterpart Korean Application No. 10-2019-7027433.
First Office Action dated Mar. 2, 2021, from The State Intellectual Property Office of People's Republic of China in counterpart Chinese Application No. 201811280592.1.

* cited by examiner

METHOD AND DEVICE FOR CONTROLLING POWER STRIP

CROSS-REFERENCE TO RELATED APPLICATION

This application is based upon and claims priority to Chinese Patent Application No. 201811280592.1, filed on Oct. 30, 2018, the entire contents of which are incorporated herein by reference.

TECHNICAL FIELD

The present disclosure relates to the technical field of intelligent house, and particularly to a method and a device for controlling a power strip.

BACKGROUND

Generally, many plugs may be inserted into a socket so as to connect with other circuits. With the advancement of technology, various electronic devices emerge, and more and more sockets are needed. Therefore, a power strip having multiple sockets plays an increasingly important role for the electronic devices.

SUMMARY

A method and device for controlling a power strip are provided according to the embodiments of the disclosure, and the technical solutions are described as follows.

According to a first aspect of embodiments of the disclosure, there is provided a method for controlling a power strip. The method includes: acquiring a present temperature parameter of an ambient environment; determining a presently-allowed maximum power of the power strip based on the present temperature parameter; acquiring a total power of electronic devices presently powered by the power strip; and controlling the power strip to cut off power supply to at least one of the electronic devices when the total power is greater than the presently-allowed maximum power.

According to a second aspect of embodiments of the disclosure, there is provided a device for controlling a power strip. The device includes: a processor; and a memory for storing instructions executable by the processor, wherein the processor is configured to: acquire a present temperature parameter of an ambient environment; determine a presently-allowed maximum power of the power strip based on the present temperature parameter; acquire a total power of electronic devices presently powered by the power strip; and control the power strip to cut off power supply to at least one of the electronic devices when the total power is greater than the presently-allowed maximum power.

According to a third aspect of the embodiments of the disclosure, a computer-readable storage medium is provided, having stored therein instructions that, when executed by a processor of a device, cause the device to perform the method for controlling the power strip according to the first aspect.

It is to be understood that the foregoing general description and the following detailed description are exemplary and explanatory only and not intended to limit the present disclosure.

BRIEF DESCRIPTION OF DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the aspects of the present disclosure. Instead, they are merely examples of apparatuses and methods consistent with aspects of the present disclosure.

At present, power strips are used not only to supply power, but also to achieve safety control. The power strip may generate heat during use, and the heat dissipation effect of the power strip may be relatively degraded if the present ambient temperature is higher, which results in safety hazard for the power strip.

In order to solve the above problem, according to the embodiment, a present temperature parameter of an ambient environment may be acquired, a presently-allowed maximum power of the power strip is determined based on the present temperature parameter, a total power of electronic devices powered through the power strip is detected, the power strip is controlled to cut off power supply to at least one of the electronic devices when the total power is greater than the presently-allowed maximum power. In this way, the presently-allowed maximum power of the power strip is automatically adjusted based on the present temperature parameter of the ambient environment of the power strip, which improves flexibility for adjusting the maximum power. The power strip is controlled to cut off power supply to at least one of the electronic devices when the total power of the electronic devices presently powered through the power strip is greater than the maximum power, thereby avoiding a problem that heat generated by the power strip which connects with a high-power electronic device cannot dissipate in time, and ensuring safety of the user during use of the power strip and the electronic devices.

Figure 1:
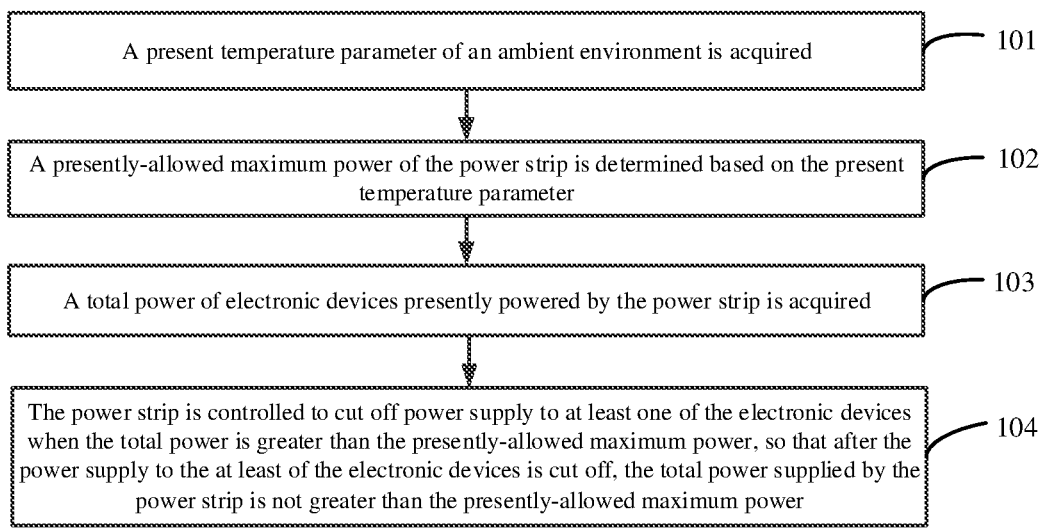
FIG. 1 is a flowchart of a method for controlling a power strip according to an exemplary embodiment.

FIG. 1 is a flowchart of a method for controlling a power strip according to an exemplary embodiment. As shown in FIG. 1, the method for controlling the power strip is applied to a power strip or a terminal, which includes the following operations 101 to 104.

At 101, a present temperature parameter of an ambient environment is acquired.

At 102, a presently-allowed maximum power of the power strip is determined based on the present temperature parameter.

At 103, a total power of electronic devices presently powered by the power strip is acquired.

At 104, the power strip is controlled to cut off power supply to at least one of the electronic devices when the total power is greater than the presently-allowed maximum power, so that after the power supply to the at least one of the electronic devices is cut off, the total power supplied by the power strip is not greater than the presently-allowed maximum power.

In an embodiment, the method for controlling the power strip may be implemented by a control device within a power strip or a terminal.

In an embodiment, the present temperature of the ambient environment refers to a real-time temperature around the power strip which is caused by the environmental temperature together with heat generated by the power strip. If the present temperature of the ambient environment of the power strip is high, the environment for heat dissipation of the power strip will get worse, i.e., the ambient environment having a higher temperature of the power strip does not facilitate the heat dissipation, which may result in safety hazard for the power strip. In this case, in order to ensure safety during use of the power strip, the allowed maximum power of the power strip is small so as to avoid the power strip from burning out since excessive heat was generated.

In addition to a basic function of supplying power to the electronic devices connected with the power strip, the power strip in the embodiment is provided with a temperature sensor thereon. After the power strip is connected to a power source (generally, the power strip is connected to a power supply jack in the room), a control device may detect and collect a present temperature parameter of an ambient environment of the power strip by the temperature sensor at intervals. The temperature sensor refers to a sensor which can sense a temperature and convert the temperature into an available output signal such as a voltage signal. The temperature parameter includes a parameter such as a voltage signal for indicating a temperature detected by the temperature sensor, and the temperature parameter may also be a temperature value.

In an embodiment, the control device may periodically acquire a present temperature parameter of the ambient environment of the power strip. The control device may then determine a presently-allowed maximum power of the power strip based on the present temperature parameter according to a rule that the presently-allowed maximum power of the power strip is decreased with an increase in a temperature indicated by the present temperature parameter of the ambient environment of the power strip.

In an embodiment, the power strip may also be provided with a power detection circuit configured to automatically detect a power of each of the electronic devices presently powered through the power strip, and acquire a total power of the electronic devices. If the control device is provided in the power strip, the control device may detect the total power of the electronic devices directly by the power detection circuit. If the control device is provided in a terminal, the control device may receive the total power of the electronic devices transmitted by the power strip.

In an embodiment, after the total power of the electronic devices is acquired by the control device, if the total power is greater than the presently-allowed maximum power, it indicates that the total power of the presently-powered electronic devices exceeds an upper limit of a power sustained by the power strip. In this case, for the sake of safety in use of the power strip, the control device may control the power strip to cut off power supply to at least one of the electronic devices to decrease a total power of the power strip, so as to avoid the power strip from burning out since excessive heat was generated. If the control device is provided in the power strip, the control device may directly cut off power supply to at least one of the electronic devices. If the control device is provided in the terminal, the control device may transmit a control instruction to the power strip to control the power strip to cut off power supply to at least one of the electronic devices.

In an embodiment, all jacks of the power strip may be controlled to be powered on or powered off through one switch. In this case, the power strip may control the one switch to be turned on so as to cut off power supply to all electronic devices connected to the power strip. In some embodiments, the power strip may be provided with multiple switches, each of which controls at least one jack to be powered on or powered off. In this case, the power strip may select to control one or more of the multiple switches to be turned off, to cut off power supply to at least one electronic device connected to the power strip, so that after the power supply to the at least one of the electronic devices is cut off, the total power supplied by the power strip is not greater than the presently-allowed maximum power. In some embodiments, all switches may be controlled to be turned off so as to cut off power supply to all electronic devices connected to the power strip, which will not be limited in the embodiments of the present disclosure.

In the embodiments, a present temperature parameter of an ambient environment of the power strip may be acquired, and a presently-allowed maximum power of the power strip is determined based on the present temperature parameter, a total power of electronic devices presently powered by the power strip is acquired, and the power strip is controlled to cut off power supply to at least one of the electronic devices when the total power is greater than the presently-allowed maximum power. In this way, the presently-allowed maximum power of the power strip is automatically adjusted based on the present temperature parameter of the ambient environment of the power strip, so that flexibility of adjusting the maximum power is improved. Power supply of the power strip to at least one of the electronic devices is cut off if the total power of all electronic devices presently powered through the power strip is greater than the maximum power, which enables to avoid a problem that heat generated by the power strip connected with a high-power electronic device cannot dissipate in time, and thus ensure safety of the user during use of the power strip and the electronic devices to some extent.

In an embodiment, the operation in 102 in the method for controlling the power strip may be implemented as follows: a presently-allowed maximum power of the power strip at the present temperature parameter is determined according to a preset correspondence between a temperature parameter and an allowed maximum power.

The preset correspondence between the temperature parameter and the allowed maximum power and the allowed maximum power may be a negative correlation.

The control device may pre-store a correspondence between a temperature parameter and an allowed maximum power. As an example, a correspondence that a temperature parameter within a range (a, b] corresponds to a maximum power c. In this way, when the acquired temperature parameter e of the ambient environment of the power strip is in the range (a, b], the control device may determine the presently-allowed maximum power of the power strip to be c.

As another example, the correspondence may also be a linear proportional correspondence: a maximum power=k*present temperature parameter+n, where k and n are constants set based on a specific power strip. In this case, the control device may determine the presently-allowed maximum power of the power strip according to a linear proportional formula after the acquired present temperature parameter e of the ambient environment of the power strip is in the range (a, b].

In the embodiment, the presently-allowed maximum power of the power strip at the present temperature parameter may be determined according to the preset correspondence between the temperature parameter and the allowed maximum power. The temperature parameter has a negative correlation with the allowed maximum power. Therefore, the presently-allowed maximum power is determined quickly and conveniently.

In an embodiment, the operation in 102 in the method for controlling the power strip may be implemented as follows: when a difference between the present temperature parameter of the ambient environment of the power strip and a temperature parameter corresponding to previously-determined maximum power is less than or equal to a preset threshold, the previously-determined maximum power is determined to be the presently-allowed maximum power of the power strip, the power strip detecting the present temperature parameter periodically; and when the difference between the present temperature parameter of the ambient environment of the power strip and the temperature parameter corresponding to the previously-determined maximum power is greater than the preset threshold, the presently-allowed maximum power of the power strip is adjusted in a preset adjustment manner.

The preset adjustment manner includes that when the present temperature parameter is increased by a preset temperature with respect to the temperature parameter corresponding to the previously-determined maximum power, the presently-allowed maximum power is decreased by a preset power with respect to the previously-determined maximum power. In some embodiments, the adjustment manner also includes that when the present temperature parameter is decreased by a preset temperature with respect to the temperature parameter corresponding to the previously-determined maximum power, the presently-allowed maximum power is increased by a preset power with respect to the previously-determined maximum power.

The power strip may detect the present temperature parameter periodically. It is assumed that when the present temperature parameter is increased by 1 degree Celsius with respect to the temperature parameter corresponding to the previously-determined maximum power, the presently-allowed maximum power is decreased by 200 Watt with respect to the previously-determined maximum power. In this way, during use of the power strip, the control device may acquire a present temperature parameter of the ambient environment by a temperature sensor at intervals. If it is determined that a difference between the present temperature parameter of the ambient environment and the temperature parameter corresponding to the previously-determined maximum power is less than or equal to a preset threshold, that is, a difference between the present temperature parameter and the temperature parameter corresponding to the previously-determined maximum power is equal to zero or less than 1 degree Celsius, which indicates change of the environmental temperature being small, and the control device may control the power strip to maintain the previously-determined power unchanged. If it is determined that the difference between the present temperature parameter of the ambient environment and the temperature parameter corresponding to the previously-determined maximum power is greater than the preset threshold, that is, the difference between the present temperature parameter and the temperature parameter corresponding to the previously-determined maximum power is greater than 1 degree Celsius, which indicates the change in the environmental temperature being large. For example, if the temperature parameter indicates that the environmental temperature increases by 1 degree Celsius, it is considered that a present environmental temperature is high and the heat dissipation effect is poor, and at this time, the control device may automatically decrease an upper limit of an allowed maximum power of the power strip by 200 Watt. In some embodiments, the control device may automatically decrease the upper limit of the allowed maximum power of the power strip by 400 Watt if the temperature parameter indicates that the environmental temperature increases by 2 degrees Celsius. In this way, the allowed maximum power of the power strip will change with the temperature of the ambient environment.

In some embodiments, a maximum power such as 2000 Watt determined at the first time and a temperature parameter such as a room temperature of 25 degrees Celsius corresponding to the maximum power are pre-stored in the control device.

In the embodiments, the previously-determined maximum power may be determined as the presently-allowed maximum power of the power strip when a difference between a present temperature parameter of the ambient environment of the power strip and the temperature parameter corresponding to the previously-determined maximum power is less than or equal to a preset threshold, and the presently-allowed maximum power of the power strip is adjusted in a preset adjustment manner when the difference between the present temperature parameter of the ambient environment of the power strip and the temperature parameter corresponding to the previously-determined maximum power is greater than the preset threshold. In this way, the present allowed maximum power is adjusted only when the difference of the temperature is large, so as to avoid unnecessary frequent adjustment.

In an embodiment, the operation in 104 in the method for controlling the power strip may be implemented as follows: the power strip is controlled to cut off power supply to one or more recently-powered electronic devices among the electronic devices.

When each of jacks of the power strip is provided with one switch correspondingly, if the total power of electronic devices powered by the power strip is greater than the presently-allowed maximum power, it indicates that the total power of the electronic devices powered through the power strip exceeds an upper limit of the presently-allowed maximum power of the power strip since the power strip supplied power to the electronic device that is powered recently by the power strip. At this time, for sake of safety in use of the power strip, the control device may control the power strip to cut off power supply to the recently-powered electronic device of the electronic devices. In this way, the total power of the power strip can be reduced to a power level that the total power of the power strip does not exceed the maximum power, so as to effectively avoid the power strip from burning out due to an excessive power for the electronic devices powered through the power strip.

In the embodiment, the power strip may be controlled to cut off power supply to one or more recently-powered electronic devices of the electronic devices when the total power of the electronic devices powered by the power strip is greater than the presently-allowed maximum power. In this way, the total power of the power strip can be reduced to a level that the total power of the power strip does not exceed the maximum power, so as to effectively avoid the power strip from burning out due to an excessive power for the electronic devices powered through the power strip.

In an embodiment, the method for controlling the power strip may further include outputting prompt information when the total power is greater than the presently-allowed maximum power. The prompt information is used to prompt a user that the power strip having an excessive power.

If the total power is greater than the presently-allowed maximum power, the control device may output the prompt information, for example, speech information "Present environmental temperature is too high, and too many electronic devices are connected to the power strip", to prompt the user that the total power of the electronic devices presently powered through the power strip exceeds the safer upper limit during use of the power strip. Therefore, upon noticing the prompt information, the user may adopt other manner to supply power to the electronic device to which the power supply is cut off.

In some embodiments, when a buzzer is provided in the power strip, the prompt information may also be buzzer sound, and the control device may output the prompt information through the buzzer. Alternatively, when each jack of the power strip may be provided with a warning light, the prompt information may also be lighting information of the warning light, and the control device may turn off the warning light corresponding to the electronic device when no power is supplied to the electronic device, and so forth.

In the embodiment, when the total power is greater than the presently-allowed maximum power, the prompt information may be outputted for prompting a user the power strip having an excessive power, so that the user may adopt other manner to supply power to the electronic device to which the power supplied through the power strip is cut off.

Figure 2:
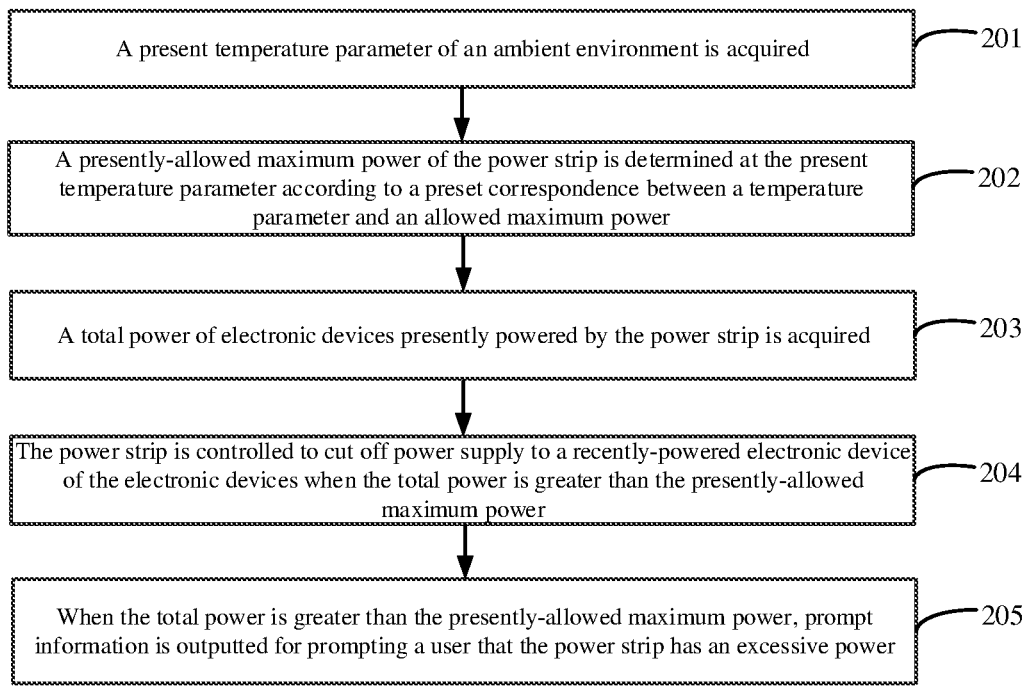
FIG. 2 is a flowchart of a method for controlling a power strip according to another exemplary embodiment.

FIG. 2 is a flowchart of a method for controlling a power strip according to an exemplary embodiment. As shown in FIG. 2, the method for controlling the power strip may be implemented by a terminal or a power strip, and includes operations 201 to 205.

At 201, a present temperature parameter of an ambient environment is acquired.

At 202, a presently-allowed maximum power of the power strip is determined at the present temperature parameter according to a preset correspondence between a temperature parameter and an allowed maximum power.

The preset correspondence between the temperature parameter and the allowed maximum power may be a negative correlation.

At 203, a total power of electronic devices presently powered by the power strip is acquired.

At 204, the power strip is controlled to cut off power supply to a recently-powered electronic device of the electronic devices when the total power is greater than the presently-allowed maximum power.

At 205, prompt information is outputted when the total power is greater than the presently-allowed maximum power. The prompt information is used to prompt a user the power strip having an excessive power.

Figure 3:
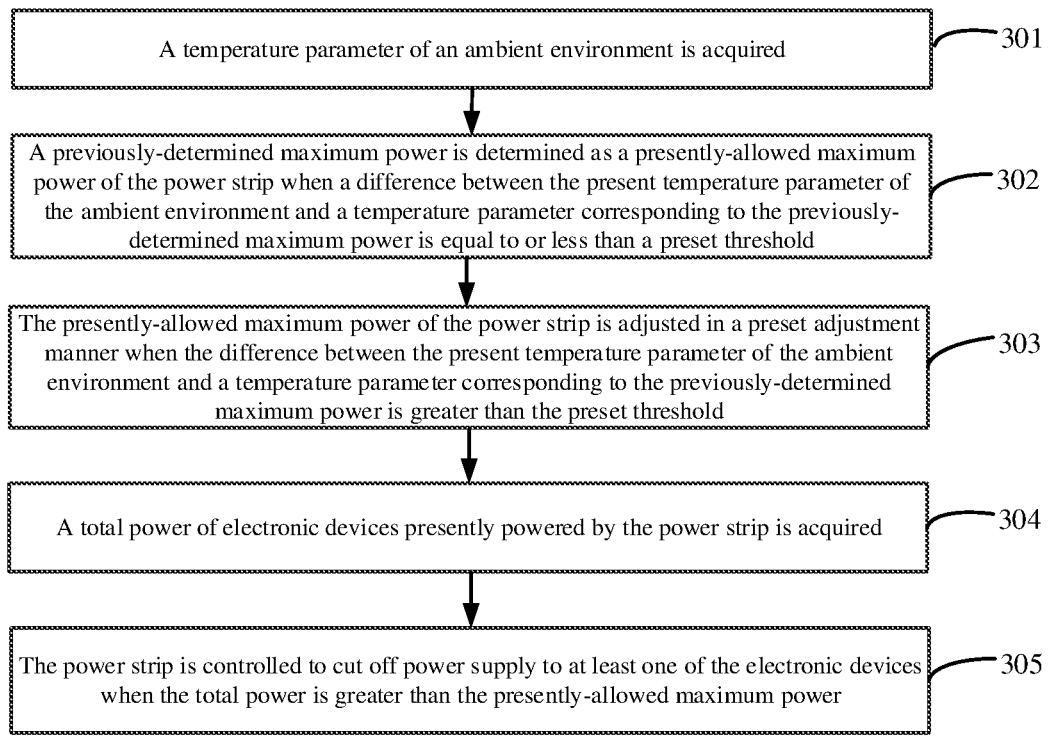
FIG. 3 is a flowchart of a method for controlling a power strip according to yet another exemplary embodiment.

FIG. 3 is a flowchart of a method for controlling a power strip according to an exemplary embodiment. As shown in FIG. 3, the method for controlling the power strip may be implemented by a terminal or a power strip, and includes operations 301 to 305.

At 301, a temperature parameter of an ambient environment is acquired.

At 302, a previously-determined maximum power is determined as a presently-allowed maximum power of the power strip when a difference between the present temperature parameter of the ambient environment and a temperature parameter corresponding to the previously-determined maximum power is equal to or less than a preset threshold.

At 303, the presently-allowed maximum power of the power strip is adjusted in a preset adjustment manner when the difference between the present temperature parameter of the ambient environment and the temperature parameter corresponding to the previously-determined maximum power is greater than the preset threshold.

The preset adjustment manner includes that when the present temperature parameter is increased by a preset temperature with respect to the temperature parameter corresponding to the previously-determined maximum power, the presently-allowed maximum power is decreased by a preset power with respect to the previously-determined maximum power.

At 304, a total power of electronic devices powered presently is acquired.

At 305, the power strip is controlled to cut off power supply to at least one of the electronic devices when the total power is greater than the presently-allowed maximum power.

Figure 4:
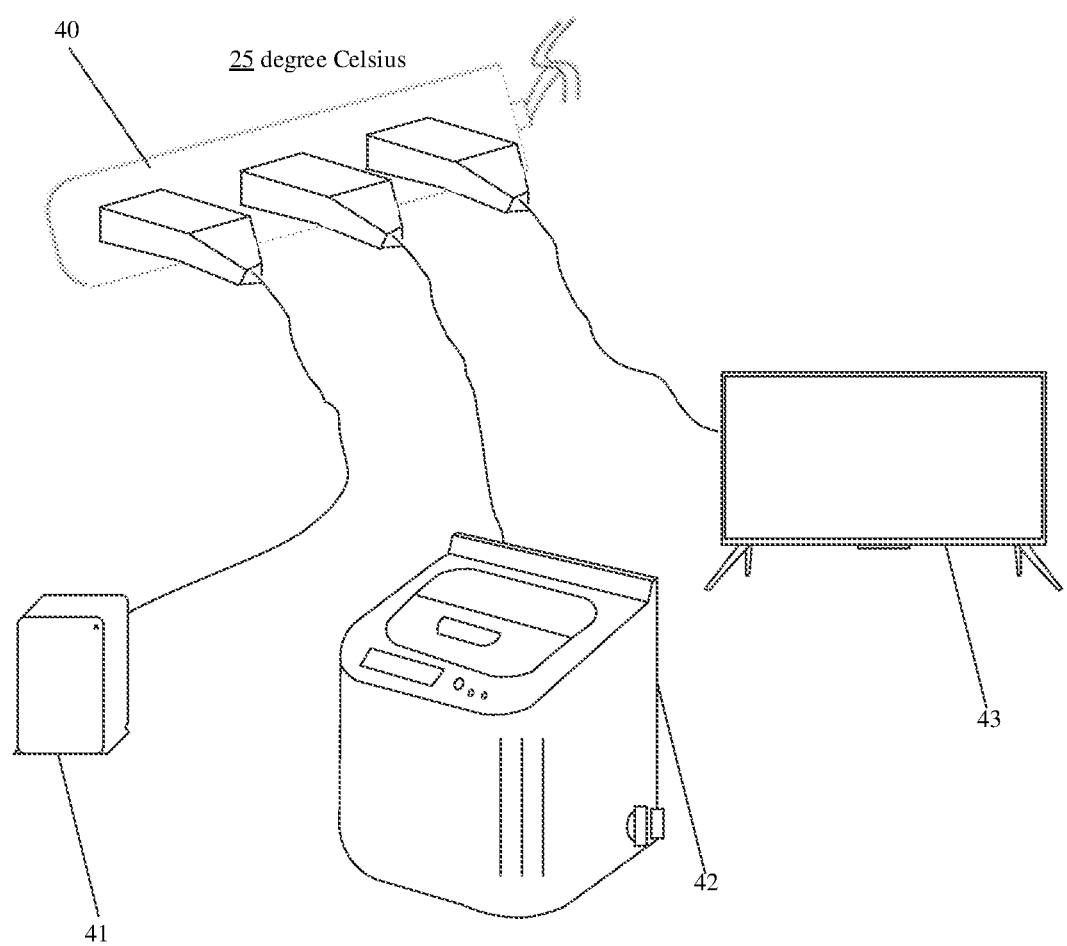
FIG. 4 is a schematic diagram of an application scenario of a method for controlling a power strip according to an exemplary embodiment.

FIG. 4 is a schematic diagram of an application of the method for controlling a power strip according to an exemplary embodiment. As shown in FIG. 4, the electronic devices may be one or more electric appliances, and the power strip 40 supplies power to the electric appliances such as an air purifier 41, a washing machine 42, and a television set 43. It is assumed that a present temperature parameter is detected to be 25 degrees Celsius, and a presently-allowed maximum power is 1300 W. It is obtained that a power of the air purifier 41 is 100 W, a power of the presently-powered washing machine 42 is 1100 W, and a power of the presently-powered television set 43 is 300 W, and thus a total power of the presently-powered electronic devices is 1500 W. In this case, the power strip is controlled to cut off power supply to the television set 43, so that after the power supply to the presently-powered television set is cut off, the total power obtained is 1200 W, which is not greater than the present maximum allowable power of 1500 W.

Figure 5:
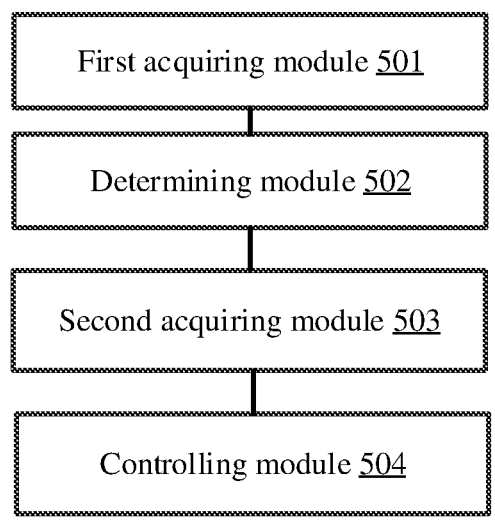
FIG. 5 is a block diagram of a device for controlling a power strip according to an exemplary embodiment.

FIG. 5 is a block diagram of a device for controlling a power strip according to an exemplary embodiment. Each module in the device may be implemented as software, hardware or a combination of software and hardware. As shown in FIG. 5, the device for controlling the power strip includes a first acquiring module 501, a determining module 502, a second acquiring module 503, and a controlling module 504.

The first acquiring module 501 is configured to acquire a present temperature parameter of an ambient environment.

The determining module 502 is configured to determine a presently-allowed maximum power of the power strip based on the present temperature parameter.

The second acquiring module 503 is configured to detect a total power of electronic devices presently powered by the power strip.

The controlling module 504 is configured to control the power strip to cut off power supply to at least one of the electronic devices when the total power is greater than the presently-allowed maximum power.

Figure 6:
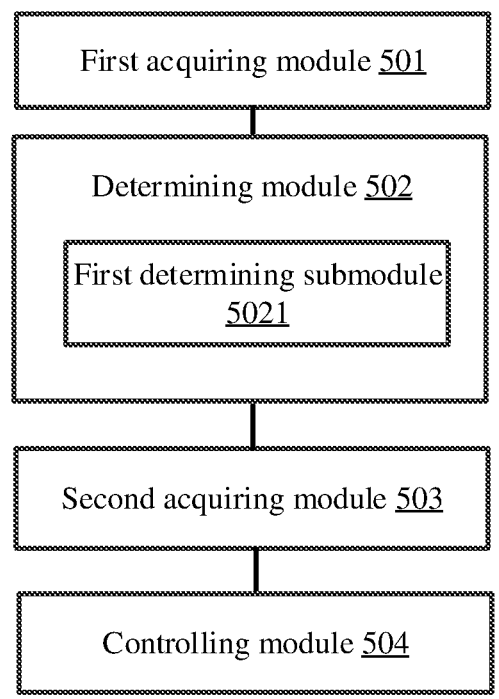
FIG. 6 is a block diagram of a device for controlling a power strip according to an exemplary embodiment.

FIG. 6 is a block diagram of a device for controlling a power strip according to an exemplary embodiment. As shown in FIG. 6, the determining module 502 of the device may include a first determining submodule 5021.

The first determining submodule 5021 is configured to determine the presently-allowed maximum power of the power strip at the present temperature parameter according to a preset correspondence between a temperature parameter and an allowed maximum power.

The preset correspondence between temperature parameter and the allowed maximum power is a negative correlation.

Figure 7:
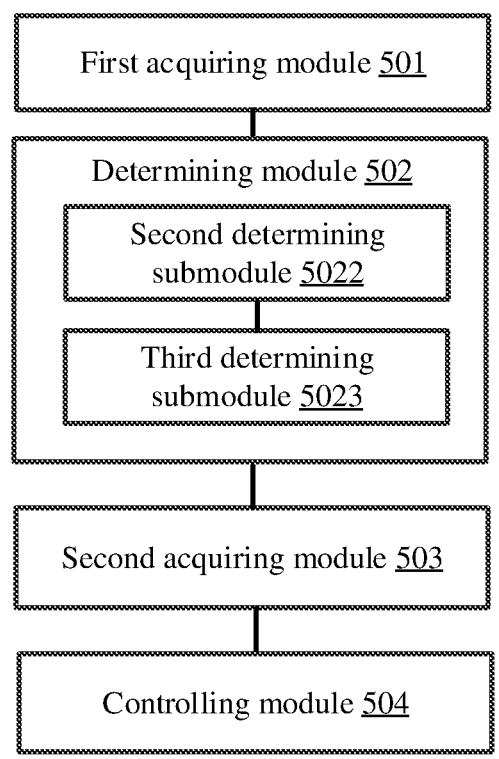
FIG. 7 is a block diagram of a device for controlling a power strip according to an exemplary embodiment.

FIG. 7 is a block diagram of a device for controlling a power strip according to an exemplary embodiment. As shown in FIG. 7, the determining module 502 of the device may include a second determining submodule 5022 and a third determining submodule 5023.

The second determining submodule 5022 is configured to determine a previously-determined maximum power as the presently-allowed maximum power of the power strip when a difference between the present temperature parameter of an ambient environment of the power strip and a temperature parameter corresponding to the previously-determined maximum power is less than or equal to a preset threshold.

The third determining submodule 5023 is configured to adjust the presently-allowed maximum power of the power strip in a preset adjustment manner when the difference between the present temperature parameter of the ambient environment of the power strip and the temperature parameter corresponding to the previously-determined maximum power is greater than the preset threshold.

The adjustment manner includes that the presently-allowed maximum power is decreased by a preset power with respect to the previously-determined maximum power when the present temperature parameter is increased by a preset temperature with respect to the temperature parameter corresponding to the previously-determined maximum power.

Figure 8:
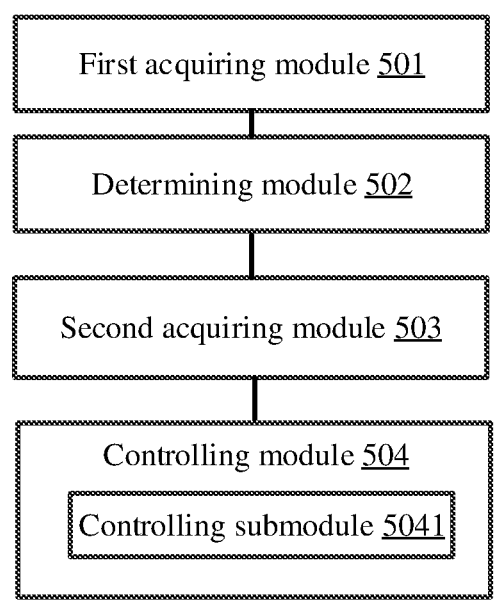
FIG. 8 is a block diagram of a device for controlling a power strip according to an exemplary embodiment.

FIG. 8 is a block diagram of a device for controlling a power strip according to an exemplary embodiment. As shown in FIG. 8, the controlling module 504 of the device may include a controlling submodule 5041.

The controlling submodule 5041 is configured to control the power strip to cut off power supply to a recently-powered electronic device of the electronic devices.

Figure 9:
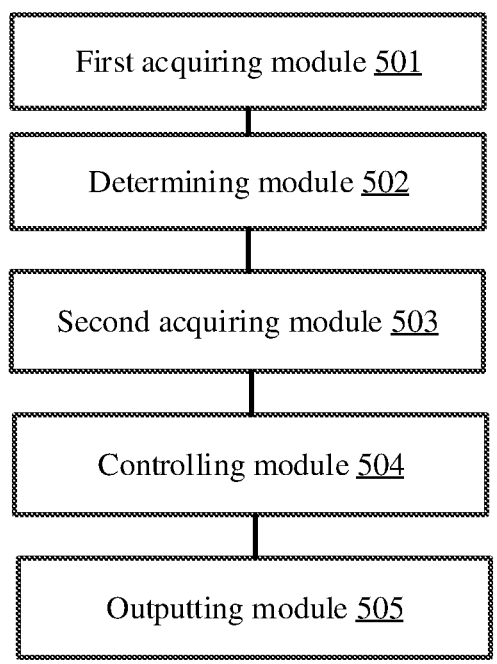
FIG. 9 is a block diagram of a device for controlling a power strip according to an exemplary embodiment.

FIG. 9 is a block diagram of a device for controlling a power strip according to an exemplary embodiment. As shown in FIG. 9, the device for controlling the power strip as described above may further include an outputting module 505.

The outputting module 505 is configured to output prompt information when the total power is greater than the presently-allowed maximum power. The prompt information is used to prompt a user the power strip having an excessive power.

With respect to the devices according to the above embodiments, the specific manners for performing operations for individual modules therein have been described in detail in the embodiments regarding the methods for controlling the power strip, which will not be repeated herein.

Figure 10:
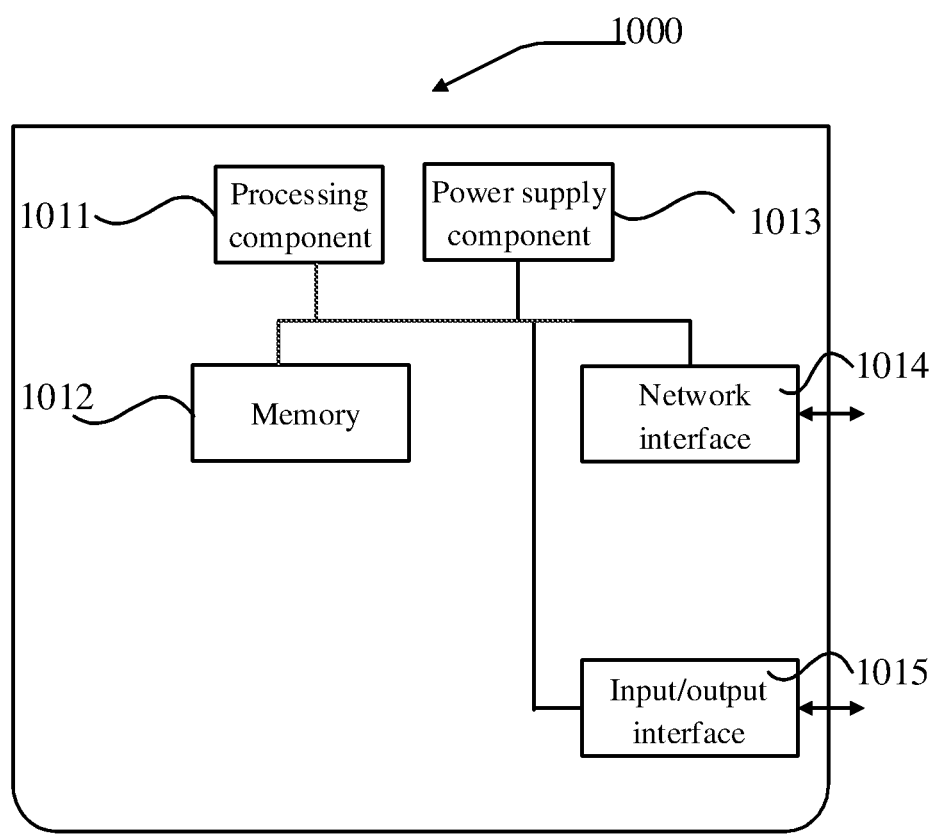
FIG. 10 is a block diagram of a device for controlling a power strip according to an exemplary embodiment.

FIG. 10 is a block diagram of a device 1000 for controlling a power strip according to an exemplary embodiment. For example, the device 1000 may be implemented as a terminal or a power strip. The device 1000 includes: a processing component 1011 including one or more processors; and memory resources represented by a memory 1012 for storing instructions (for example, an application) executable by the processing component 1011. The application stored in the memory 1012 may include one or more modules, each of which corresponds to a set of instructions. In addition, the processing component 1011 is configured to execute the instructions to implement the above method for controlling the power strip.

The device 1000 may further include: a power supply component 1013 configured to perform power supply management of the device 1000; one wired or wireless network interface 1014 configured to connect the device 1000 to a network; and an input/output (I/O) interface 1015. The device 1000 may operate an operating system stored in the memory 1012, such as Windows Server™, Mac OS X™, Unix™, Linux™, FreeBSD™ or the like.

A non-transitory computer-readable memory medium is provided, which causes the device 1000 to execute the above method for controlling the power strip when the instructions in the memory medium are executed by the processor of the device 1000. The method includes the following operations: a present temperature parameter of an ambient environment is acquired; a presently-allowed maximum power of the power strip is determined based on the present temperature parameter; a total power of electronic devices powered presently by the power strip is acquired; and the power strip is controlled to cut off power supply to at least one of the electronic devices when the total power is greater than the presently-allowed maximum power.

In an embodiment, the operation that the presently-allowed maximum power of power strip is determined based on the present temperature parameter includes: the presently-allowed maximum power of the power strip is determined at the present temperature parameter according to a preset correspondence between a temperature parameter and an allowed maximum power; the temperature parameter having a negative correlation with the allowed maximum power.

In an embodiment, the operation that the presently-allowed maximum power of power strip is determined based on the present temperature parameter includes the following operations.

A previously-determined maximum power is determined as the presently-allowed maximum power of the power strip when a difference between the present temperature parameter of the ambient environment and a temperature parameter corresponding to the previously-determined maximum power is equal to or less than a preset threshold.

The presently-allowed maximum power of the power strip is adjusted in a preset adjustment manner when the difference between the present temperature parameter of the ambient environment and the temperature parameter corresponding to the previously-determined maximum power is greater than the preset threshold.

The adjustment manner includes that when the present temperature parameter is increased by a preset temperature with respect to the temperature parameter corresponding to the previously-determined maximum power, the presently-allowed maximum power is decreased by a preset power with respect to the previously-determined maximum power.

In an embodiment, the operation that the power strip is controlled to cut off power supply to at least one of the electronic devices includes: the power strip is controlled to cut off power supply to a recently-powered electronic device of the electronic devices.

In an embodiment, the method further includes outputting prompt information when the total power is greater than the presently-allowed maximum power, and the prompt information is used to prompt a user that the power strip has an excessive power.

A device for controlling a power strip is further provided according to the embodiment, which includes a processor and a memory for storing instructions executable by the processor. The processor is configured to: acquire a present temperature parameter of an ambient environment; determine a presently-allowed maximum power of the power strip based on the present temperature parameter; acquire a total power of all electronic devices presently powered by the power strip; and control the power strip to cut off power supply to at least one of the electronic devices when the total power is greater than the presently-allowed maximum power.

In an embodiment, determining the presently-allowed maximum power of the power strip based on the present temperature parameter includes: determining the presently-allowed maximum power of the power strip at the present temperature parameter according to a preset correspondence between a temperature parameter and an allowed maximum power. The temperature parameter has a negative correlation with the allowed maximum power.

In an embodiment, determining the presently-allowed maximum power of the power strip based on the present temperature parameter includes: determining a previously-determined maximum power to be the presently-allowed maximum power of the power strip when a difference between the present temperature parameter of the ambient environment and a temperature parameter corresponding to the previously-determined maximum power is less than or equal to a preset threshold; and adjusting the presently-allowed maximum power of the power strip in a preset adjustment manner when the difference between the present temperature parameter of the ambient environment and the temperature parameter corresponding to the previously-determined maximum power is greater than a preset threshold;

The adjustment manner includes that the presently-allowed maximum power is decreased by a preset power with respect to the previously-determined maximum power when the present temperature parameter is increased by a preset temperature with respect to the temperature parameter corresponding to the previously-determined maximum power.

In an embodiment, controlling the power strip to cut off power supply to at least one of the electronic devices includes: controlling the power strip to cut off power supply to a recently-powered electronic device of the electronic devices.

In an embodiment, the above processor may be further configured to output prompt information when the total power is greater than the presently-allowed maximum power. The prompt information is used to prompt a user that power of the power strip is excessive.

Other embodiments of the disclosure will be apparent to those skilled in the art from consideration of the specification and practice of the disclosure. The application is intended to cover any variations, uses or adaptations of the disclosure following the general principles thereof and including such departures from the present disclosure as come within known or customary practice in the art. It is intended that the specification and examples be considered as exemplary only, with a true scope and spirit of the disclosure being indicated by the following claims. It should be understood that the disclosure is not limited to the exact construction that has been described above and shown in the accompanying drawings, and that various modifications and changes can be made without departing from the scope thereof. It is intended that the scope of the disclosure only be limited by the appended claims.

The technical solutions according to embodiments of the disclosure may include advantageous effects as follows. A present temperature parameter of an ambient environment is acquired, a presently-allowed maximum power of the power strip is determined based on the present temperature parameter, a total power of electronic devices presently powered by the power strip is detected, and the power strip is controlled to cut off power supply to at least one of the electronic devices when the total power is greater than the presently-allowed maximum power. In this way, the presently-allowed maximum power of the power strip is automatically adjusted based on the present temperature parameter of the ambient environment of the power strip, so that flexibility of adjusting the maximum power is improved. The power strip is controlled to cut off power supply to at least one of the electronic devices when the total power of electronic devices presently powered by the power strip is greater than the maximum power, which enables to avoid a problem that heat generated by the power strip connected with a high-power electronic device cannot dissipate in time, and thus ensure safety of the user during use of the power strip and the electronic devices to some extent.

The invention claimed is:

1. A method for controlling a power strip, comprising:
   acquiring a present temperature parameter of an ambient environment;
   determining a presently-allowed maximum power of the power strip based on the present temperature parameter, comprising:
   determining a previously-determined maximum power as the presently-allowed maximum power of the power strip when a difference between the present temperature parameter of the ambient environment and a temperature parameter corresponding to the previously-determined maximum power is less than or equal to a preset threshold; and
   adjusting the presently-allowed maximum power of the power strip in a preset adjustment manner when the difference between the present temperature parameter of the ambient environment and the temperature parameter corresponding to the previously-determined maximum power is greater than the preset threshold;
   acquiring a total power of electronic devices presently powered by the power strip; and
   controlling the power strip to cut off power supply to at least one of the electronic devices when the total power is greater than the presently-allowed maximum power.

2. The method according to claim 1, wherein determining the presently-allowed maximum power of the power strip based on the present temperature parameter comprises:
   determining the presently-allowed maximum power of the power strip at the present temperature parameter according to a preset correspondence between a temperature parameter and an allowed maximum power,
   wherein the preset correspondence between the temperature parameter and the allowed maximum power is a negative correlation.

3. The method according to claim 1, wherein the preset adjustment manner comprises:
when the present temperature parameter is increased by a preset temperature with respect to the temperature parameter corresponding to the previously-determined maximum power, the presently-allowed maximum power is decreased by a preset power with respect to the previously-determined maximum power; and
when the present temperature parameter is decreased by a preset temperature with respect to the temperature parameter corresponding to the previously-determined maximum power, the presently-allowed maximum power is increased by a preset power with respect to the previously-determined maximum power.

4. The method according to claim 1, wherein controlling the power strip to cut off power supply to the at least one of the electronic devices comprises:
controlling the power strip to cut off power supply to a recently-powered electronic device of the electronic devices.

5. The method according to claim 1, further comprising:
outputting, when the total power is greater than the presently-allowed maximum power, prompt information for prompting a user that the power strip has an excessive power.

6. A device for controlling a power strip, comprising:
a processor; and
a memory for storing instructions executable by the processor,
wherein the processor is configured to:
acquire a present temperature parameter of an ambient environment;
determine a presently-allowed maximum power of the power strip based on the present temperature parameter, wherein determining the presently-allowed maximum power of the power strip comprises:
determining a previously-determined maximum power as the presently-allowed maximum power of the power strip when a difference between the present temperature parameter of the ambient environment and a temperature parameter corresponding to the previously-determined maximum power is less than or equal to a preset threshold; and
adjusting the presently-allowed maximum power of the power strip in a preset adjustment manner when the difference between the present temperature parameter of the ambient environment and the temperature parameter corresponding to the previously-determined maximum power is greater than the preset threshold;
acquire a total power of electronic devices presently powered by the power strip; and
control the power strip to cut off power supply to at least one of the electronic devices when the total power is greater than the presently-allowed maximum power.

7. The device according to claim 6, wherein the processor is further configured to:
determine the presently-allowed maximum power of the power strip at the present temperature parameter according to a preset correspondence between a temperature parameter and an allowed maximum power,
wherein the preset correspondence between the temperature parameter and the allowed maximum power is a negative correlation.

8. The device according to claim 6, wherein preset adjustment manner comprises:
when the present temperature parameter is increased by a preset temperature with respect to the temperature parameter corresponding to the previously-determined maximum power, the presently-allowed maximum power is decreased by a preset power with respect to the previously-determined maximum power; and
when the present temperature parameter is decreased by a preset temperature with respect to the temperature parameter corresponding to the previously-determined maximum power, the presently-allowed maximum power is increased by a preset power with respect to the previously-determined maximum power.

9. The device according to claim 6, wherein controlling the power strip to cut off power supply to at least one of the electronic devices comprises:
controlling the power strip to cut off power supply to a recently-powered electronic device of the electronic devices.

10. The device according to claim 6, wherein the processor is further configured to:
output, when the total power is greater than the presently-allowed maximum power, prompt information for prompting a user that the power strip has an excessive power.

11. A non-transitory computer-readable storage medium having stored therein instructions that, when executed by a processor of a device, cause the device to perform a method for controlling a power strip, the method comprising:
acquiring a present temperature parameter of an ambient environment;
determining a presently-allowed maximum power of the power strip based on the present temperature parameter, comprising:
determining a previously-determined maximum power as the presently-allowed maximum power of the power strip when a difference between the present temperature parameter of the ambient environment and a temperature parameter corresponding to the previously-determined maximum power is less than or equal to a preset threshold; and
adjusting the presently-allowed maximum power of the power strip in a preset adjustment manner when the difference between the present temperature parameter of the ambient environment and the temperature parameter corresponding to the previously-determined maximum power is greater than the preset threshold;
acquiring a total power of electronic devices presently powered by the power strip; and
controlling the power strip to cut off power supply to at least one of the electronic devices when the total power is greater than the presently-allowed maximum power.

12. The non-transitory computer-readable storage medium according to claim 11, wherein determining the presently-allowed maximum power of the power strip based on the present temperature parameter comprises:
determining the presently-allowed maximum power of the power strip at the present temperature parameter according to a preset correspondence between a temperature parameter and an allowed maximum power,
wherein the preset correspondence between the temperature parameter and the allowed maximum power is a negative correlation.

13. The method according to claim 11, wherein the preset adjustment manner comprises:
when the present temperature parameter is increased by a preset temperature with respect to the temperature parameter corresponding to the previously-determined maximum power, the presently-allowed maximum power is decreased by a preset power with respect to the previously-determined maximum power; or when the present temperature parameter is decreased by a preset temperature with respect to the temperature parameter corresponding to the previously-determined maximum power, the presently-allowed maximum power is increased by a preset power with respect to the previously-determined maximum power.

14. The non-transitory computer-readable storage medium according to claim 11, wherein controlling the power strip to cut off power supply to the at least one of the electronic devices comprises:

controlling the power strip to cut off power supply to a recently-powered electronic device of the electronic devices.

15. The non-transitory computer-readable storage medium according to claim 11, the method further comprising:

outputting, when the total power is greater than the presently-allowed maximum power, prompt information for prompting a user that the power strip has an excessive power.

\* \* \* \* \*